United States Patent [19]

Blom

[11] 4,285,479
[45] Aug. 25, 1981

[54] INERTIA RELEASE FOR BELT RETRACTOR WINDING PREVENTION MECHANISM

[75] Inventor: Hubert P. Blom, Royal Oak, Mich.

[73] Assignee: General Motors Corporation, Detroit, Mich.

[21] Appl. No.: 120,573

[22] Filed: Feb. 11, 1980

[51] Int. Cl.³ .................. A62B 35/02; B65H 75/48
[52] U.S. Cl. ........................ 242/107.4 A; 242/107.6
[58] Field of Search ............ 242/107.7, 107.6, 107.12, 242/107.4 R-E; 280/806-808; 297/474-480

[56] References Cited

U.S. PATENT DOCUMENTS

| | | | |
|---|---|---|---|
| 3,619,524 | 11/1971 | Gillund | 200/61.45 |
| 3,869,098 | 3/1975 | Sprecher | 242/107.4 A |
| 4,002,311 | 1/1977 | Fisher et al. | 242/107.7 X |
| 4,066,223 | 1/1978 | Takada | 242/107.7 X |
| 4,153,274 | 5/1979 | Rogers et al. | 242/107.7 X |
| 4,165,054 | 8/1979 | Collins | 242/107.7 |

FOREIGN PATENT DOCUMENTS 5255118  5/1977  Japan ..................... 242/107.6

*Primary Examiner*—John M. Jillions
*Attorney, Agent, or Firm*—Charles E. Leahy

[57] ABSTRACT

A seat belt retractor has a winding spring biasing a belt reel in the belt winding direction to pull the belt taut about the occupant. A first inertia-sensing means is adapted to sense a predetermined level of vehicle deceleration and lock the belt reel against belt unwinding rotation to restrain the occupant in the seat. Ratchet teeth carried by the reel in the belt winding direction are selectively engageable by a detent member. A control means is operable to move the detent member to a detenting position engaging ratchet teeth to prevent winding of the reel and thereby relieve the belt tension on the occupant by establishing a slackened belt condition about the occupant. A second inertia-sensing means senses a predetermined level of vehicle deceleration less than the level sensed by the first inertia-sensing means and is adapted to move the detent member to the undetenting position to restore the winding effort of the winding spring and pull the belt taut against the occupant prior to locking of the belt reel against belt unwinding rotation by the first inertia-sensing means.

3 Claims, 3 Drawing Figures

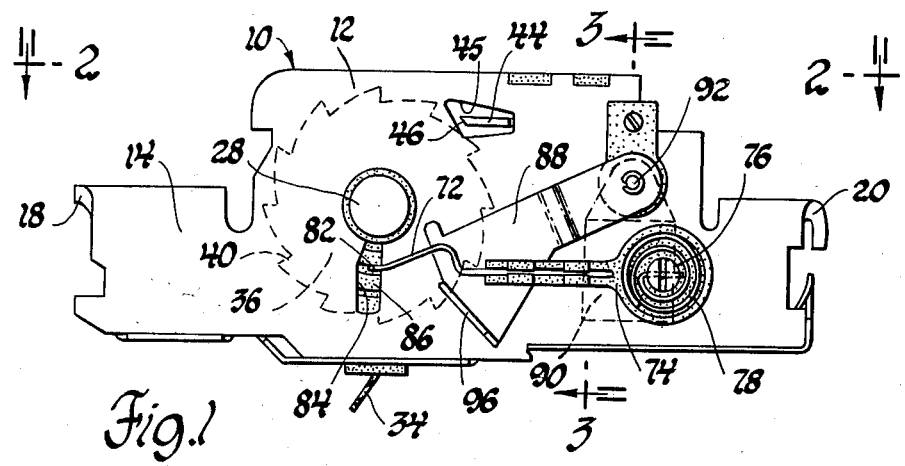
Fig.1
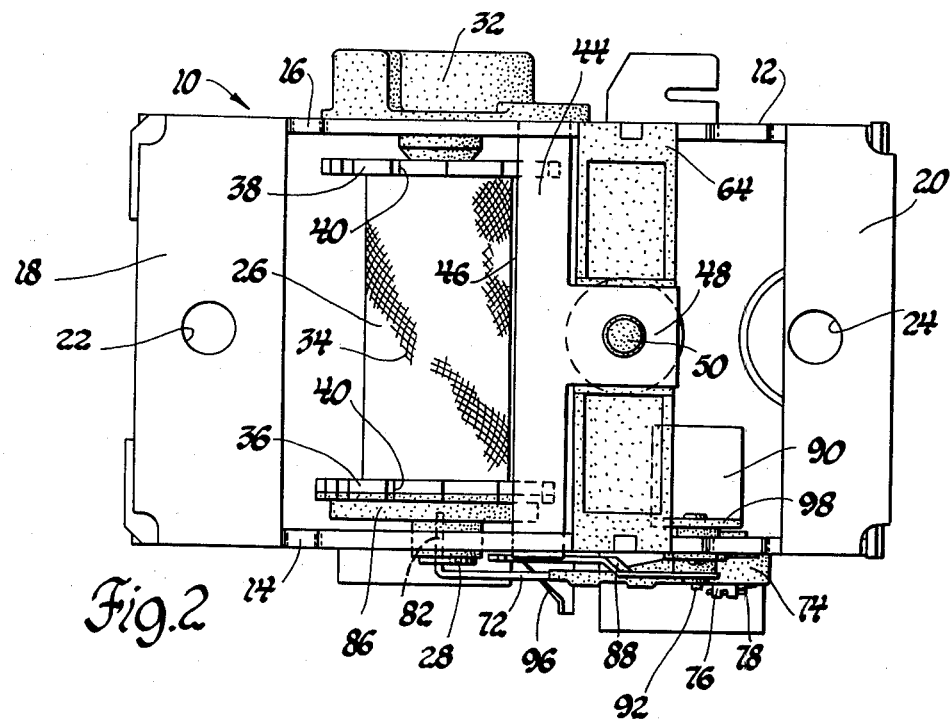
Fig.2
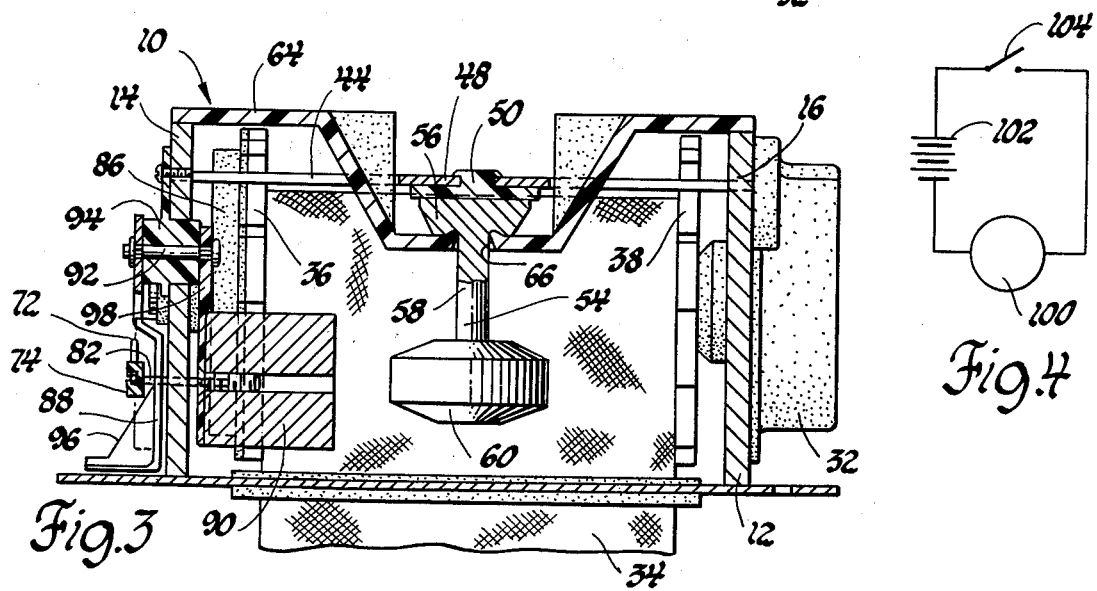
Fig.3
Fig.4

INERTIA RELEASE FOR BELT RETRACTOR WINDING PREVENTION MECHANISM

The invention relates generally to a seat belt retractor for a vehicle occupant restraint system and more particularly provides a winding prevention mechanism which is cancelled and released upon occurrence of predetermined level of vehicle deceleration.

BACKGROUND OF THE INVENTION

Vehicle occupant restraint belt retractors have heretofore been provided with winding prevention mechanisms for selectively relieving the tension on the belt to enhance comfort of the restrained occupant. U.S. Pat. No. 3,869,098 by Raymond G. Sprecher, issued Mar. 4, 1975, discloses a belt retractor in which actuation of the winding prevention feature occurs in response to a predetermined sequence of belt winding and unwinding movement. U.S. Pat. No. 4,153,274 by Lloyd W. Rogers et al, issued May 8, 1979, provides a winding prevention mechanism which is manually actuated.

It is characteristic of the winding prevention mechanisms of both the above-captioned patents that the winding prevention feature is cancelled in response to a predetermined extent of belt unwinding so that the winding effort of the wind-up spring is restored to pull the belt taut about the seated occupant. In a retractor having such a winding prevention mechanism, it is possible for the vehicle occupant to unbuckle the seat belt without having performed the belt unwinding motion necessary to cancel the winding prevention mechanism and the belt will not be retracted onto the reel. U.S. Pat. No. 3,973,786 by Lloyd W. Rogers, issued Aug. 10, 1976, provides an improvement wherein the winding prevention mechanism is automatically cancelled whenever the door is moved from the closed to the open position.

SUMMARY OF THE INVENTION

The present invention provides a further improvement in belt retractor winding prevention mechanisms and more particularly provides an inertia sensor adapted to cancel the winding prevention mechanism upon occurrence of a sensed condition of vehicle deceleration so that the belt will be rewound to a taut condition about the occupant.

A seat belt retractor according to the invention includes a winding spring normally biasing a belt reel in the belt winding direction to pull a restraint belt taut about the occupant. A first inertia sensing means is adapted to sense a predetermined level of vehicle deceleration and lock the belt reel against belt unwinding rotation upon occurrence of the predetermined level. Ratchet teeth are carried by the belt reel for rotation therewith and face in the belt winding direction. A detent member is operated by a control means between a detenting position engaging the ratchet teeth and an undetenting position. Movement of the detent member to the detenting position prevents winding of the reel by the wind-up spring and prevents belt tension on the occupant by establishing a slackened belt condition about the occupant. A second inertia sensing means senses a predetermined level of vehicle deceleration less than the level sensed by the first inertia sensing means and is adapted to move the detent member to the undetenting position irrespective of control of the detent member by the control means whereby the winding spring effort is restored to rotate the reel in the belt winding direction of rotation and pull the belt taut against the occupant prior to locking of the belt reel against belt unwinding rotation by the first inertia sensing means.

Accordingly, the object, feature and advantage of the invention resides in the provision of a seat belt retractor winding prevention means which is cancelled upon occurrence of a predetermined level of vehicle deceleration.

Another object, feature and advantage of the invention resides in the provision of a winding prevention mechanism for a seat belt retractor which is cancelled upon occurrence of a predetermined level of vehicle deceleration less than the level at which the reel is locked against belt unwinding rotation so that the reel is rotated in the belt winding direction to pull the belt taut against the occupant.

DESCRIPTION OF THE DRAWINGS

These and other objects, features and advantages of the invention will become apparent upon consideration of the specification and the appended drawings in which:

FIG. 1 is a side elevation view of a seat belt retractor embodying the invention;

FIG. 2 is a plan view of a seat belt retractor embodying the invention and taken in the direction of arrows 2—2 of FIG. 1;

FIG. 3 is a sectional view taken in the direction of arrows 3—3 of FIG. 1; and

FIG. 4 discloses a second embodiment of the invention wherein the inertia sensor is electrically coupled to the retractor.

DESCRIPTION OF THE PREFERRED EMBODIMENT

Referring to FIGS. 1, 2 and 3 of the drawings, a vehicle occupant restraint belt retractor is generally indicated at 10 and includes a housing 12. Housing 12 includes a pair of laterally spaced housing side walls 14 and 16 which are connected by base walls 18 and 20. The base walls 18 and 20 have apertures 22 and 24 which receive bolts for mounting the housing 12 on the vehicle body. A belt reel 26 is rotatably mounted between the housing walls 14 and 16 by a reel shaft 28 which extends through aligned apertures of the housing walls 14 and 16. A spiral winding spring, not shown, is enclosed within a housing 32 and acts between the housing wall 16 and the reel shaft 28 to bias the reel 26 in the direction to wind a restraint belt 34 thereon. A pair of ratchet plates 36 and 38 are attached to the reel shaft 28 respectively adjacent the housing walls 14 and 16 and have ratchet teeth 40 which face in the belt unwinding direction.

A lock bar 44 is provided for selective locking engagement with the ratchet teeth 40 of ratchet plates 36 and 38. The ends of lock bar 44 extend through aligned triangular apertures 45 of the housing 12 to permit limited rotary movement of the lock bar to carry a locking face 46 of the lock bar into engagement with the ratchet teeth 40. As best seen in FIGS. 2 and 3, the lock bar has a tail portion 48 which carries a plastic button 50.

A pendulum assembly 54 includes a control head 56, stem 58 and an inertia weight 60. A plastic pendulum support 64 extends between the housing walls 14 and 16 and has a central aperture 66 which receives the pendulum stem 58 so that the control head 56 is supported on the pendulum support. The plastic button 50 of the lock bar rests upon pendulum control head 56 to support the lock bar 44 in a normal position in which the lock bar locking face 46 is spaced away from engagement with the ratchet teeth 40.

The occurrence of a vehicle deceleration condition of predetermined magnitude causes the pendulum assembly 54 to tilt from the normal vertically depending position of FIG. 3 and in so doing pivots the lock bar 44 into engagement with the ratchet plate teeth 40 to thereby lock the reel 26 against rotation in the belt unwinding direction. Accordingly, the length of the restraint belt 34 is fixed and the occupant is restrained upon the seat during vehicle deceleration. When the vehicle deceleration condition terminates, the pendulum assembly 54 returns to the normal vertical depending position of FIG. 3, allowing the lock bar 44 to disengage from the ratchet teeth 40 of ratchet plates 36 and 38.

A winding prevention mechanism acts between the reel 26 and the housing wall 14 to selectively lock the reel 26 against belt winding rotation by the effort of the winding spring. The winding prevention mechanism includes a pawl wire 72 which is mounted on the housing wall 14 by a plastic rotary member 74 which is rotatably mounted on the housing wall 14 by a screw 76. A spiral spring 78 encircles the screw 76 and acts between the screw and the rotary member 74 to urge the rotary member to the position of FIG. 1. The pawl wire 72 has an inwardly bent detent arm 82 which extends through an access slot 84 of the housing wall 14 into engagement with an injection molding plastic control disc 86. The control disc 86 has a series of concentric and spiral tracks which are connected by ramps in a manner known to move the pawl wire detent arm 82 radially and axially upon occurrence of a predetermined sequence of belt winding and unwinding reel rotation in order to selectively engage the detent arm 82 with circumferentially spaced ratchet teeth also carried by the control disc. Engagement of the pawl wire detent arm 82 with the ratchet teeth locks the reel 26 against the belt winding rotation by the effort of the winding spring so that the belt may be established in a slackened condition about the occupant. U.S. Pat. No. 4,002,311 by Robert C. Fisher et al, issued Jan. 11, 1977, is incorporated herein by reference and provides a further disclosure of the manner in which the winding prevention mechanism is constructed and operated.

The present invention provides a release mechanism by which the winding prevention mechanism is cancelled to restore the belt winding effort of the winding spring upon occurrence of a vehicle deceleration condition of predetermined magnitude. The release mechanism includes a cam member 88 and a pendulum 90. The cam member 88 is preferably of stamped steel construction and is pivotally mounted by attachment to a pivot shaft 92 which is rotatably journaled in a bushing 94 attached to the housing wall 14. The cam member 88 has a cam surface 96 which is adapted for selective engagement with the pawl wire 72 to move the pawl wire 72 axially outwardly away from the control disc 86. The pendulum 90 includes an arm 98 which is also attached to the pivot shaft 92 to support the pendulum 90 for pivotal movement. As best seen in FIGS. 1 and 3, the pendulum 90 has a normal vertically depending position in which the cam member 88 is established in the normal rotary position of FIGS. 1, 2 and 3. Accordingly, the cam surface 96 does not contact the pawl wire 72 so that the pawl wire functions under normal control of the control disc 86.

Upon occurrence of a predetermined level of vehicle deceleration, the pendulum 90 pivots in the forward clockwise direction as viewed in FIG. 1. Accordingly, the cam member 88 coupled to the pendulum 90 by the pivot shaft 92 is also rotated in the clockwise direction as viewed in FIG. 1 to carry the cam surface 96 thereof into engagement with the pawl wire 72. Accordingly, the pawl wire 72 is displaced axially of the reel 26 and out of engagement with the ratchet teeth of the control disc 86 to cancel and release the winding prevention mechanism and restore the effort of the winding spring to rotate the reel 26 in the belt winding direction and tighten the belt 34 about the occupant.

It will be understood that the pendulum 90 is constructed to be sensitive to a level of vehicle deceleration less than the level of deceleration which influences the pendulum assembly 54. Accordingly, the winding prevention mechanism will be cancelled at a low level of vehicle deceleration so that the winding spring will tighten the restraint belt 34 about the occupant. Then the occurrence of greater level of vehicle deceleration causes the pendulum assembly 54 to move the lock bar 44 into engagement with the teeth 40 of ratchet plates 36 and 38 to lock the reel 26 against belt unwinding rotation.

Referring to FIG. 4, there is shown an electrical circuit by which an inertia sensing switch may be employed to control a solenoid for disengaging the pawl wire 72 from the control disc 86. Referring to FIG. 4, it is seen that a solenoid 100 similar to the solenoid 54 of U.S. Pat. No. 4,002,311 by Fisher et al is connected through ground to a battery or other current source 102. An inertia actuated switch 104 is disposed in a circuit between the battery 102 and solenoid 100 and is adapted to momentarily complete the electrical circuit therebetween upon occurrence of a vehicle deceleration condition of predetermined magnitude. A suitable inertia sensor switch is shown in U.S. Pat. No. 3,619,524 by Arden G. Gilluno, issued Nov. 9, 1971.

Thus, it is seen that the invention provides a new and improved winding prevention mechanism which is cancelled and released upon occurrence of a sensed condition of vehicle deceleration so that the effort of the winding spring is restored and the belt is rewound to a taut restraining position about the seated occupant.

The embodiments of the invention for which an exclusive property or privilege is claimed are defined as follows:

1. A vehicle occupant restraint belt retractor comprising:

a housing; a belt reel rotatably mounted on the said housing; a restraint belt attached to the reel and wound and unwound thereon during reel rotation; a winding spring normally biasing the reel in the belt winding direction of rotation to pull the belt taut about the occupant; a first inertia-sensing means adapted to sense a predetermined level of vehicle deceleration and lock the belt reel against belt unwinding rotation upon occurrence of the predetermined level; detent means acting between the reel and the housing to selectively lock the reel against belt winding rotation by the winding spring and thereby relieve belt tension on the occupant by establishing a slackened belt condition about the vehicle occupant; a second inertia-sensing means for sensing a predetermined second level of vehicle deceleration less than the level of deceleration sensed by the first inertia-sensing means and adapted to unlock the detent means whereby the winding spring effort is restored to rotate the reel in the belt winding direction of rotation to pull the belt taut against the vehicle occupant prior to locking of the belt reel against belt unwinding rotation by the first inertia-sensing means.

2. A vehicle occupant restraint belt retractor comprising:

a housing; a belt reel rotatably mounted on the housing; a restraint belt attached to the reel and wound and unwound thereon during reel rotation; a winding spring normally biasing the reel in the belt winding direction of rotation to pull the belt taut about the occupant; a first inertia sensing means adapted to sense a predetermined level of vehicle deceleration and lock the belt reel against belt unwinding rotation upon occurrence of the predetermined level; a ratchet wheel mounted on the belt reel for rotation therewith and having ratchet teeth facing in the belt winding direction; a detent member movable between a detenting position engaging the ratchet teeth of the ratchet wheel to prevent belt winding reel rotation and an undetenting position permitting belt winding reel rotation by the winding spring; control means operable to move the detent member to detenting position to prevent winding of the reel and thereby prevent belt tension on the occupant by establishing a slacked belt condition about the occupant, a second inertia sensing means for sensing a predetermined level of vehicle deceleration less than the level of deceleration sensed by the first inertia sensing means; and means acting between the second inertia sensing means and the detent member adapted to move the detent member to the undetenting position irrespective of control of the detent member by the control means whereby the winding spring is effective to rotate the reel in the belt winding direction of rotation to pull the belt taut against the occupant prior to locking of the belt reel against belt unwinding rotation by the first inertia sensing means.

3. A vehicle occupant restraint belt retractor comprising:

a housing; a belt reel rotatably mounted on the said housing; a restraint belt attached to the reel and wound and unwound thereon during reel rotation; a winding spring normally biasing the reel in the belt winding direction of rotation to pull the belt taut about the occupant; lock bar and ratchet means acting between the reel and housing and being actuable to selectively lock the belt reel against belt unwinding rotation and permit winding rotation of the reel; a first inertia-sensing means adapted to sense a predetermined level of vehicle deceleration and actuate the lock bar and ratchet means; detent means acting between the reel and the housing to selectively lock the reel against belt winding rotation by the winding spring and thereby relieve belt tension on the occupant by establishing a slackened belt condition about the vehicle occupant; a second inertia-sensing means for sensing a predetermined second level of vehicle deceleration less than the level of deceleration sensed by the first inertia-sensing means and adapted to unlock the detent means whereby the winding spring effort is restored to rotate the reel in the belt winding direction of rotation as permitted by the lock bar and ratchet means to pull the belt taut against the vehicle occupant prior to locking of the belt reel against belt unwinding rotation by the first inertia-sensing means.

* * * * *